(12) United States Patent
Agapi et al.

(10) Patent No.: US 8,417,529 B2
(45) Date of Patent: Apr. 9, 2013

(54) SYSTEM AND METHODS FOR PROMPTING USER SPEECH IN MULTIMODAL DEVICES

(75) Inventors: Ciprian Agapi, Lake Worth, FL (US); Soonthorn Ativanichayaphong, Boca Raton, FL (US); Leslie R. Wilson, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1309 days.

(21) Appl. No.: 11/616,682

(22) Filed: Dec. 27, 2006

(65) Prior Publication Data
US 2008/0162143 A1 Jul. 3, 2008

(51) Int. Cl.
*G10L 21/00* (2006.01)
(52) U.S. Cl. .................................. 704/270; 704/231
(58) Field of Classification Search .................. 704/270, 704/275
See application file for complete search history.

(56) References Cited

U.S. PATENT DOCUMENTS

| | | | |
|---|---|---|---|
| 6,018,711 A * | 1/2000 | French-St. George et al. | 704/275 |
| 6,233,560 B1 | 5/2001 | Tannenbaum | |
| 6,405,168 B1 | 6/2002 | Bayya et al. | |
| 6,587,820 B2 * | 7/2003 | Kosaka et al. | 704/257 |
| 2002/0062213 A1 * | 5/2002 | Kosaka et al. | 704/251 |
| 2004/0006474 A1 * | 1/2004 | Gong et al. | 704/270.1 |
| 2004/0138890 A1 * | 7/2004 | Ferrans et al. | 704/270.1 |
| 2004/0236574 A1 * | 11/2004 | Ativanichayaphong et al. | 704/231 |
| 2005/0033582 A1 * | 2/2005 | Gadd et al. | 704/277 |
| 2005/0091059 A1 * | 4/2005 | Lecoeuche | 704/270.1 |
| 2005/0187789 A1 | 8/2005 | Hatlestad et al. | |
| 2005/0203747 A1 | 9/2005 | Lecoeuche | |
| 2005/0273759 A1 * | 12/2005 | Lucassen et al. | 717/105 |
| 2006/0235694 A1 * | 10/2006 | Cross et al. | 704/270.1 |
| 2006/0247925 A1 * | 11/2006 | Haenel et al. | 704/215 |
| 2007/0266077 A1 * | 11/2007 | Wengrovitz | 709/203 |
| 2009/0254347 A1 | 10/2009 | Moore et al. | |

* cited by examiner

*Primary Examiner* — Douglas Godbold
(74) *Attorney, Agent, or Firm* — Wolf, Greenfield & Sacks, P.C.

(57) ABSTRACT

A method for prompting user input for a multimodal interface including the steps of providing a multimodal interface to a user, where the interface includes a visual interface having a plurality of input regions, each having at least one input field; selecting an input region and processing a multi-token speech input provided by the user, where the processed speech input includes at least one value for at least one input field of the selected input region; and storing at least one value in at least one input field.

27 Claims, 3 Drawing Sheets

SYSTEM AND METHODS FOR PROMPTING USER SPEECH IN MULTIMODAL DEVICES

FIELD OF THE INVENTION

The present invention is related to the field of multimodal devices and more particularly, to systems and methods for prompting and cueing user input for multimodal interfaces using speech input.

BACKGROUND OF THE INVENTION

Computing devices containing multimodal interfaces have been proliferating. A multimodal interface as used herein refers to an interface that includes both voice processing and visual presentation capabilities. For example, numerous cellular telephones can include a graphical user interface and be capable of responding to speech commands and other speech input. Other multimodal devices can include personal data assistants, notebook computers, video telephones, teleconferencing devices, vehicle navigation devices, and the like.

Traditional methods for vocally interacting with multimodal devices typically involve first audibly or textually prompting a user for speech input. Responsive to this prompting, the device receives a requested speech input. Next, an audible or textual confirmation of the speech input can be presented to the user. Such interactions are typically slow due to the need of such methods to serially relay messages between the user and the multimodal devices. The inefficiency of these methods of prompting and confirmation can result in considerable user frustration and dissatisfaction.

Such interactions, typical of conventional systems, fail to take advantage of the capabilities of visual displays in multimodal devices to provide alternative approaches to prompt or cue multi-token speech input for speech recognition purposes. Accordingly, there is a need for systems and methods utilized with multimodal devices that enable such devices to use the capabilities of visual interfaces advantageously to provide simple, efficient, and accurate mechanisms for prompting and cueing user to provide multi-token input speech.

SUMMARY OF THE INVENTION

The present invention is directed for systems and methods for providing more efficient and accurate prompting for multi-token speech from users of devices using multimodal interfaces. The present invention utilizes an enhanced visual interface which allows minimal prompting for users to provide multi-token input speech. The user can then interact with the multimodal interface accordingly, relying on the visual cues, rather than direct prompting, to construct a multi-token speech input for multiple fields.

In a first embodiment of the invention, a method for prompting user input for a multimodal interface includes providing the multimodal interface to a user, where the interface includes a visual interface having a plurality of input regions, where each input region includes at least one input field. The method also includes selecting one of the input regions and processing a multi-token speech input provided by the user, where the processed speech input includes at least one value for an input field of the selected input region. The method also includes storing the one value in the one input field.

In a second embodiment of the invention, a system for prompting voice interactions for a multimodal interface is provided. The multimodal interface includes a controller element that generates the multimodal interface, where the interface comprises a visual interface having a plurality of input regions, and wherein each input regions includes at least one input field. The controller element can also select one of the input regions and process a multi-token speech input received by the controller element, where the processed speech input includes at least one value for at least one input field of the selected input region. The controller element can also store at least one value in at least one input field.

In a third embodiment of the invention, a computer-readable storage is provided. The storage having stored thereon, a computer program having a plurality of code sections executable by a computer for causing the machine to provide a multimodal interface to a user, where the interface comprises a visual interface having a plurality of input regions, and where each input region comprises at least one input field. The code sections can also cause the machine to select one of the input regions and process a multi-token speech input provided by the user, where the processed speech input comprises at least one value for at least one input field of the selected input region. The code sections can also cause the machine to store at least one value in at least one input field.

In some embodiments, the user can be prompted to provide a multi-token speech input. The prompt can comprise visually indicating within the multimodal interface the selected input region. Alternatively, the prompt can comprise visually indicating within the multimodal interface at least one incomplete input field of the selected input region. Additionally, the prompt can comprise audibly indicating the selected input region.

In other embodiments, the selected input region can be determined by processing a selection speech input from the user. Alternatively, the selected input region can be chosen from among one or more of the plurality of input regions having at least one incomplete input field.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

With reference now to the various figures in which like elements are identically numbered throughout, a description of the various embodiments of the invention will now be provided. While the invention is disclosed in the context of a limited number of arrangements, it can be appreciated that the invention can include numerous modifications from the presented embodiments.

The invention disclosed herein provides alternative methods and systems for prompting and cueing voice interactions via a visual interface of a multimodal device. The voice interactions can occur via a multimodal interface that includes a speech recognition engine for receiving speech input and using one or more visual indicia within the multimodal interface to signal a user as to the contents of speech input currently requested by the multimodal device.

Figure 1:
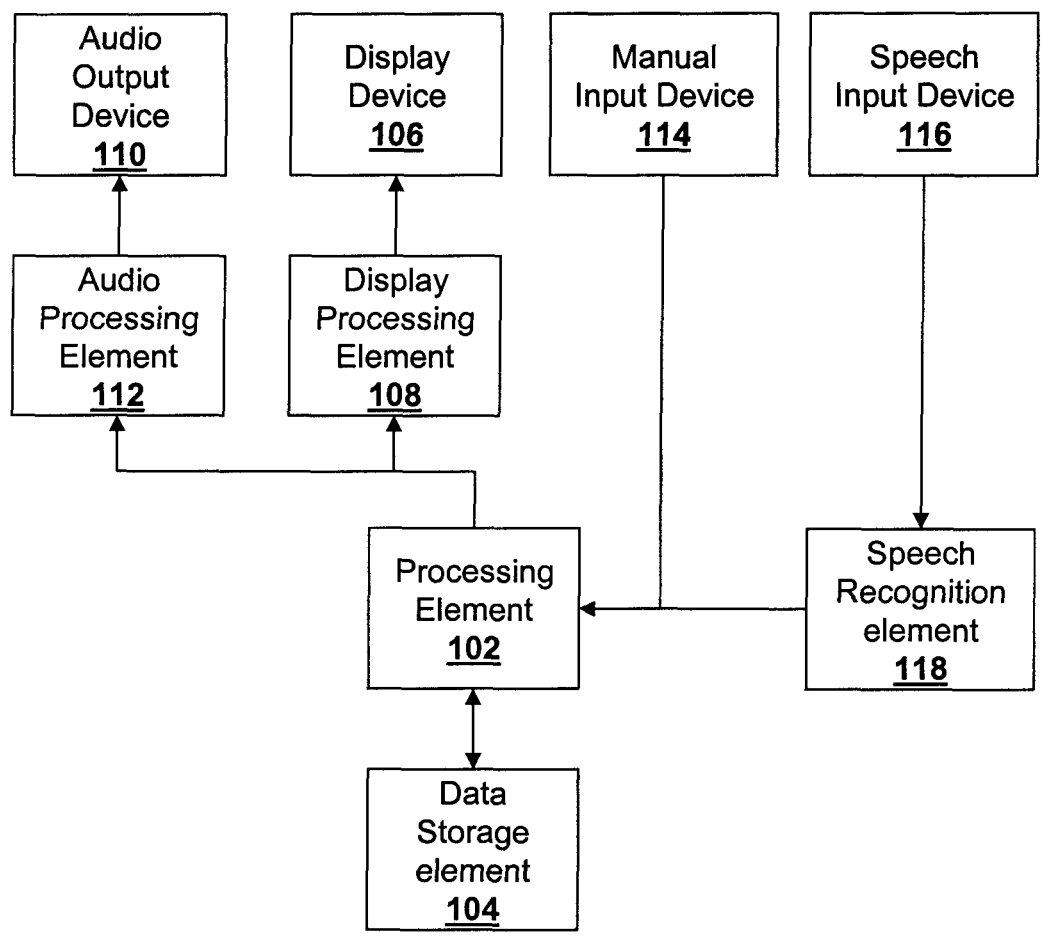
FIG. 1 is a schematic view of an exemplary system, according to one embodiment of the present invention.

FIG. 1 is an exemplary schematic diagram illustrating a multimodal system 100, according to one embodiment of the invention, for prompting and cueing user speech input using a visual interface. In general, the system 100 comprises a multimodal computing device providing a visual interface. The system 100 can be any multimodal computing device that also accepts audio signals for performing speech recognition functions. Furthermore, the system 100 can be any multimodal device that can also include user interface devices with audio and/or visual presentation capabilities.

For example, a system 100 can be multimodal computing device such as, but not limited to, personal data assistant (PDA) devices equipped with a microphone, cellular telephone devices with a display screen, computing tablet devices, personal computer devices, or vehicle navigation system devices. The system 100 can also be a multimodal computing device comprising a series of connected computing devices with both audio and visual capabilities, such as telephony devices communicatively linked to a liquid crystal display, or teleconference devices linked to a television or other visual presentation device. Additionally, the speech recognition capabilities of the system 100 can be remotely or locally located. For example, the speech recognition capabilities for a cellular telephone can reside within a voice recognition network element that is communicatively linked to the cellular telephone. Alternately, a personal data assistant can have embedded speech recognition capabilities.

The system 100 described herein and as shown in the schematic FIG. 1 provides for one or more exemplary components for the system 100 in the various embodiments. However, in some embodiments, the one or more exemplary components of the system 100 can be combined into a single or multiple computing devices. Accordingly, the embodiment shown in FIG. 1 and described herein can be considered a logical representation for the purposes of illustrating one embodiment of the present invention.

As illustrated in FIG. 1, the system 100 can comprise a processing or controller element 102 for managing operation of the system 100. The processing element 102 can be coupled to a data storage element 104 of the system to store and retrieve information to be shown on a display device 106 coupled to the processing element 102. As further shown in the FIG. 1, a separate display processing element 108, such as a graphics processor or application, can be provided to configure the display device 106 to present the visual interface as required by the processing element 102. Similarly, the processing element 102 can be coupled to an audio output device 110, such as a speaker or other device capable of producing sounds, to provide audible prompts for a user. As shown in the illustrated schematic, a separate audio processing element 112, such as an audio processor or application, can be provided to configure the audio output device 110 to produce or playback audio signals as required by the processing element 102. In some embodiments, an audio processing element 112 can also comprise a speech synthesis engine for providing a "voice" response to the user.

The system 100 can also comprise one or more manual input devices 114 coupled to the processing element 102, including, but not limited to, touch-screen devices, keyboards or other direct input devices, and pointing devices, to allow a user to manually input information. Additionally, the system 100 can also comprise a microphone or other speech input device 116, coupled to a speech recognition element 118, which in turn is coupled to the processing element 102, to accept user speech input and to process the user speech input to discern one or more words for the processing element 102 to use as values for input fields defined in an interface.

In conventional computing devices, values for input fields, such as in an electronic form, are typically entered using an input device, such as a keyboard or pointing device. For multimodal devices, the typical entry method disclosed in the prior art is for the multimodal device to provide audible or textual prompts to guide users in providing the necessary input speech for the device. One method has been to prompt a user for a single speech input or token, on an input field by input field basis, which typically results in a long and tedious entry of multiple fields. Another method has been to allow entry to be completed using a multi-token entry, allowing the entry of several fields at the same time. However, in such multi-token speech approaches, as the number of items being entered into the device increases, the more thorough a prompt is generally required, which can become longer and again more tedious for the user. In addition, as the prompt becomes longer, a distracted user may fail to provide a complete or proper response. Additionally, even when a textual prompt is provided, methods in the prior art generally still require a field by field approach or require a separate input interface.

Figure 2A:
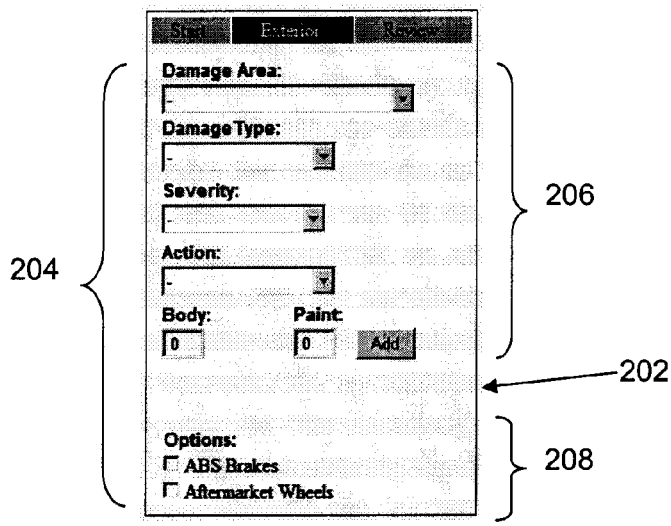
FIG. 2(a) depicts an exemplary user interface layout, according to another embodiment of the present invention.

However, the present invention does not rely on the generation of complicated audible or textual cues to cue a user as to how to provide an appropriate multi-token input to generate values for input fields of a visual interface, such as a form as illustrated in FIG. 2(a). The present invention instead provides an enhanced visual interface for the user, in which additional indicia for portions of the visual interface for the system 100 are used to identify one or more fields to be used to cue the user on how to construct a multi-token input.

A visual user interface 202 for use in the present invention, as illustrated in FIG. 2(a), can include one or more input fields 204 corresponding to data fields to be entered via speech or some other input method of the multimodal computing device. Input fields 204 can generally comprise any type of input field 204 that can normally be entered via an input device such as a keyboard or other pointing device, including, but not limited to character entry fields, pull down boxes, radio buttons, and selection boxes. Additionally, the input fields 204 can be grouped and organized in the visual interface 202 to define one or more input regions 206, 208. For example, as shown in the illustrated example in FIG. 2(a), the visual interface 202 provides an entry form for an automobile insurance inspector. A first input region 206 provides input fields 202, in the form of pull down boxes and text entry boxes, describing damage to an automobile, while the second input region 206 provides selection boxes for describing special features of the automobile.

Figures 2B, 2C:
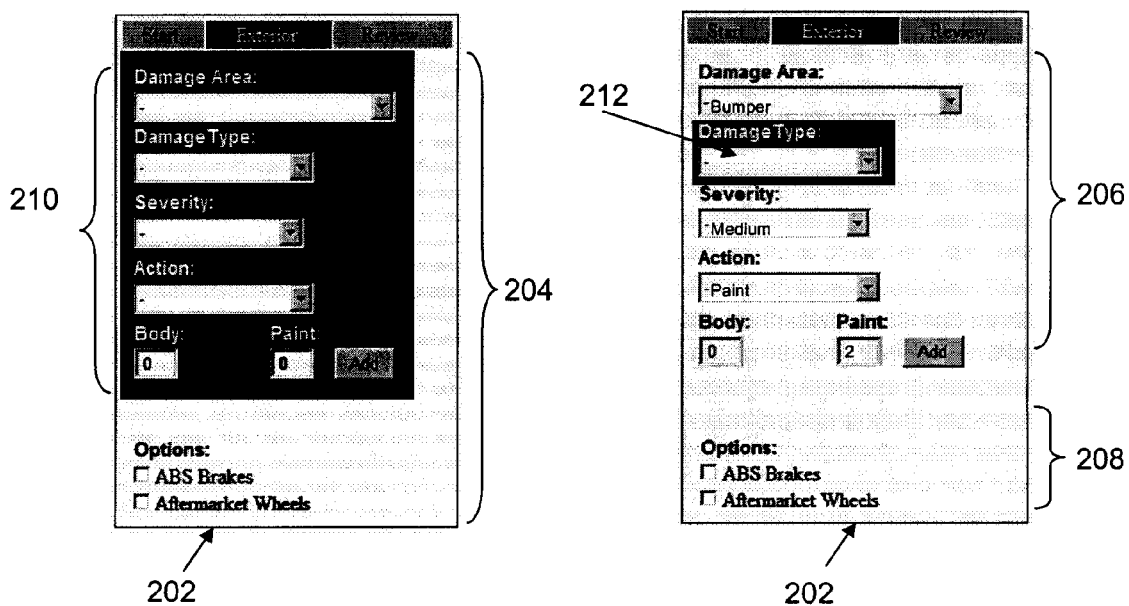
FIG. 2(b) depicts an exemplary user interface operating according to still another embodiment of the present invention.
FIG. 2(c) depicts another exemplary user interface operating according to yet another embodiment of the present invention.

The present invention can be further used to identify an active input region 210 of the visual interface to the user. An active input region can include one or more of the input fields 204. The processing element 102 and/or the speech recognition element 118 can then be configured to expect a multi-token speech input based on the input fields 204 of the active input region 210. For example, as shown in FIG. 2(b), the visual interface 202 can be configured to provide the identification of the active input region 210 by providing indicia or otherwise highlighting or marking the active input region 210. In the interface 202, the active input region 210 can be highlighted or marked by providing re-coloring or shading of the active input region 210, by altering the size, font, or colors of the input fields 204 in the active input region 210, or by providing markings, symbols, or other indicia to identify the active input region 210.

Therefore, by using the additional indicia rather than just a textual or audible prompting for one or more fields, the present invention provides an enhanced visual interface 202 which provides visual multi-token speech cues to the user, as the illustrated by the visual interface in FIG. 2(b). The advantage of such an approach is that it provides accurate and near instantaneous cueing. An additional advantage to such an approach is that in cases where the user is momentarily distracted, the user need only look at the input fields 204 in the identified active input region 210 in the visual interface 202 to remember what entries are needed for the multi-token speech input. Another advantage to this method is that by providing indicia for an entire active input region 210, the identification provided to the user can be based on the organization or layout of the visual interface and a multi-token speech input can be more easily constructed by the user, since the terms for the multi-token speech input would comprise generally related or associated terms.

Additionally, because the input fields 204 required for a multi-token speech input are already visually identified in the interface 202, a simpler audible or textual prompting of the user to provide a speech input for the active input region 210 can also be provided. For example, in the illustrated interface in FIG. 2(b), a simple audio and/or textual prompt, such as "Enter Damage Report Item", can be provided, rather than providing a prompt listing each and every input field in the input region. A user can then visually review the input fields 204 associated with the active input region 210 and enter the information using an input device or provide a multi-token speech input identifying the values for each input field 204 in the active input region 210.

Additionally, the interface 202 can be further configured to cue a user to enter information for incomplete input fields 212 by highlighting one or more of the incomplete input fields 212 existing in an input region 206, as shown in the exemplary interface in FIG. 2(c). For example, as illustrated in FIG. 2(c), in response to a multi-token speech input that fails to provide a value for the field "Damage Type", the corresponding input field 212 can be highlighted in the visual interface 202. In some embodiments, a highlighted input field 212 and a active input region can be highlighted or otherwise identified differently. In other embodiments, as shown in FIG. 2(c), the interface can be configured to display only highlighted incomplete input fields 212 if at least one other input field 204 is complete, rather than highlighting the entire active input region. Regardless of the approach used, by separately highlighting incomplete input fields 212, the user can be visually cued to construct an appropriate multi-token entry to complete the active input region 210. In some embodiments, incomplete input fields 212 can be highlighted whether or not they are part of the active input region 210. In such embodiments, the incomplete input fields 212 that are not in the active input region 210 can be highlighted or otherwise be identified differently.

Figure 3:
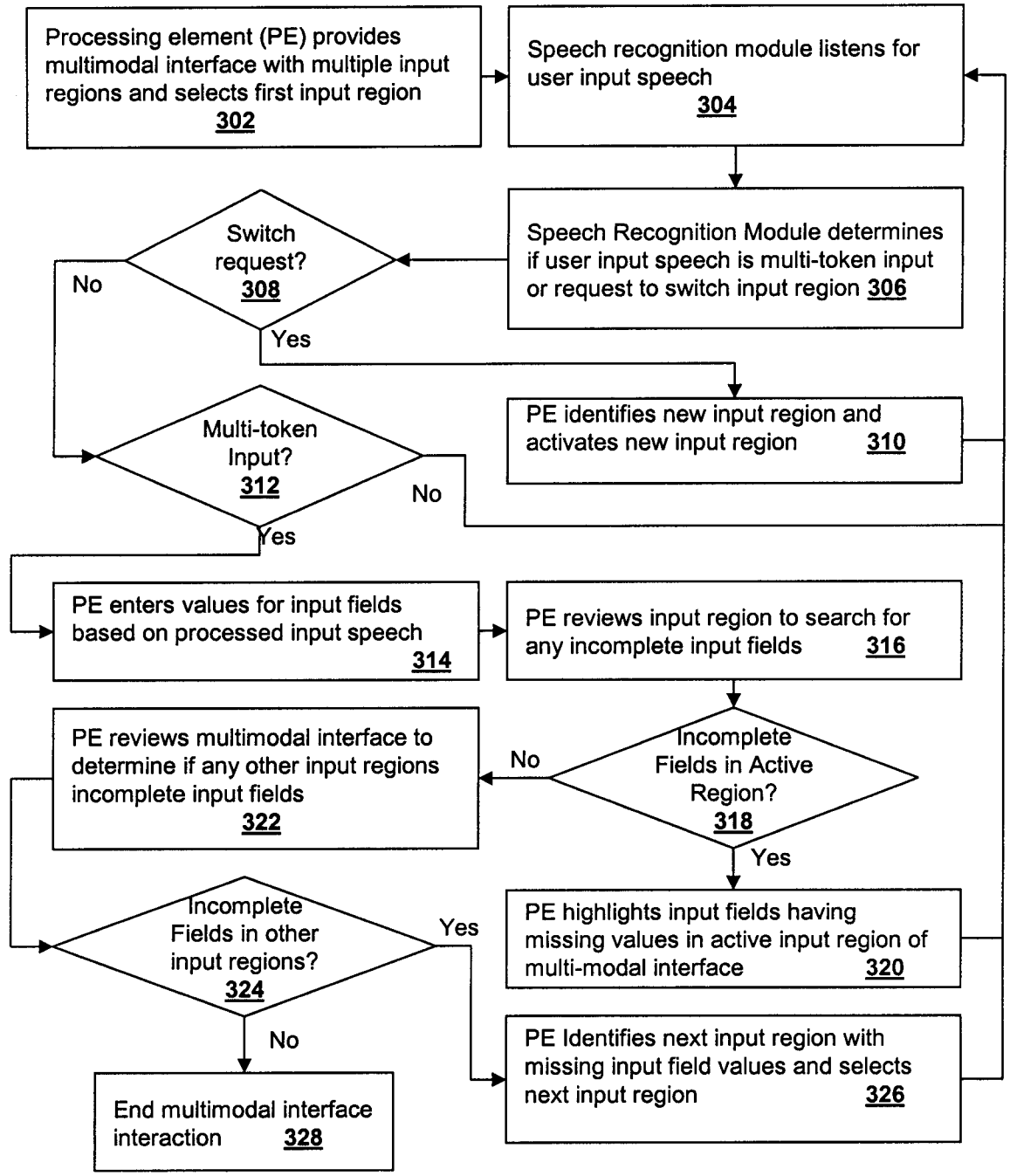
FIG. 3 is a flow chart of exemplary steps of a method for performing a multimodal interaction operating in a system, according to another embodiment of the present invention.

Together, highlighting incomplete input fields 212 and/or visually defining active input regions 210 of an interface 202 can be used to provide alternate methods for prompting and cueing users to provide multi-token speech input during an interaction with a multimodal device, such as in the exemplary method 300 for the system 100, as shown in FIG. 3. Method 300 begins with the processing element 102 of the system 100 generating a visual interface 202 having a plurality of input fields defining a plurality of input regions 206, 208 and making active on the of input regions 206, 208 at step 302.

In the various embodiments, the information defining input fields 204 or input regions 206, 208 can be retrieved from the data storage element 104. In some embodiments, as previously discussed, the processing element 102 can be also configured to provide an audible or textual prompt for the user, identifying the active input region 210, so as to prompt the user to refer to the identified active input region 210 for the necessary contents for a multi-token speech input currently expected by the system 100. Such an audible or textual prompt can be provided via the audio device 110 or the display device 106, respectively.

A speech input device 116 can then be configured to receive a speech input from the user at step 304. The speech input provided by the user can be a multi-token entry comprising of one or more words which can define values for the various input fields 204 of the active input region 210. Upon receipt of a user speech input, a speech recognition element 118 can then be configured to process the input speech received according to at least one grammar and provide the output to the processing element 102. Although a single grammar for the entire interface 202 can be provided, a different grammar for each input field 206, 208, can be provided to allow more efficient processing of a received multi-token speech input. Using the grammar appropriate for the active input region 210, the speech recognition element 118 can then be used to identify any values included in the multi-token speech input. However, a multi-token speech input can also be processed based on a least one additional grammar. For example, an additional grammar used can be one for the processing of user speech input to identify an input region 206, 208 of the visual interface 202. In such embodiments, the processing element 102 can be configured to determine, based on the output of the speech processing element 118, at step 306, whether the input speech comprises a multi-token speech input for the active input region 210 or an identification of an input region 206, 208 the user wishes to switch to.

If the processing element 102 determines that the input speech is a switch request then at step 308, the processing element 102 identifies which input region 206, 208 is being selected by the user input speech and instructs the display device 106 to display as active the newly identified input region, step 310. Afterwards, the system 100 can continue to wait for new user speech input to be received at step 304, which can be subsequently processed based on the grammar for the newly active input region 210. In some embodiments, the processing element 102 can further be configured to provide a textual or audible prompt to identify the newly active input region to the user.

However, if the processing element 102 instead determines that the speech input is a multi-token speech input for the active input region 210 then at step 312, the processing element 102 can use the processed input speech from the speech recognition element 118 and store values for the input fields 204 in the active input region 210 at step 314. However, if the processing element 102 determines that the input speech comprises neither a switch request nor a multi-token input for the highlighted input region, the system 100 can be configured to continue to wait for further speech input at step 304. Additionally, in some embodiments, if the processing element 102 determines that the input speech neither comprises a switch request or a multi-token request for the active input region 210, or if the speech recognition module is otherwise unable to process the user input speech, a grammar associated one or more other input regions 206, 208 can be used to process the input speech instead. In such embodiments, if the processing element 102 determines that based on the output of the speech recognition element 118, a grammar associated with another input region 206, 208, other than the active region 210, is appropriate, the processing element 102 can be configured to automatically make the other input region 206, 208 active and the speech recognition element 118 can process the input speech according to the grammar of the newly active input region 210 instead.

After the processing element 102 has stored one or more values for the input fields 204 of the active input region 210 based on the input speech, the processing element 102 can be configured to determine, at step 316, whether any input fields 204 of the active input region 210 still require an entry. In such embodiments, the absence or existence of incomplete input fields 212 can be used to signal the device to make active a different input region 206, 208 or to prompt the user for more information for the currently active input region 210. As illustrated, when the processing element 102 determines that there are missing values for one or more input fields 204 at step 318, the processing element 102 can configure the interface, at step 320, to highlight or identify only incomplete input fields 212, as illustrated in FIG. 2(c), and to further prompt the user for further input. The system 100 can then wait for further speech input from the user to provide the additional information at step 304, where the highlighted incomplete input fields 212 are available to cue the user to provide an appropriate multi-token speech input to provide the information for the incomplete input fields. Additionally, the user can be audibly or textually prompted to enter information for the incomplete input fields 212.

However, if the processing element 102 determines in step 318 that there are no incomplete input fields 212 in the active input region 210, the processing element 102 can be configured to make active a different input region 206, 208 of the interface 202. In some embodiments, the processing element 102 can be configured to prompt the user to identify a next input region 206, 208 to make active. In other embodiments, as illustrated in the exemplary method 300 at step 322, the device can be configured to review all the input regions 206, 208 of the interface 202 and choose the next input region 206, 208 to make active only an input regions 206 still having incomplete input fields 212. If the processing element 102 can identify at least one other input region having one or more incomplete input fields 212 at step 324, then the processing element 102 can be configured, at step 326, to select the associated input region 206 to make active. Additionally, the processing element 102 can instruct the display device 106 to provide indicia to identify in the interface 202 one or more incomplete input fields 212, as previously discussed. The system 100 can then wait for further speech input from the user at step 304 to provide the additional information. If no incomplete input fields are found in step 324, the interaction necessary for the visual interface 202 is complete (step 328) and the system 100 can continue with its operation.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for prompting and processing user input for a multimodal interface, the method comprising:
   electronically rendering a visual interface for the multimodal interface, the visual interface comprising a plurality of concurrently displayed input regions;
   selecting an active input region of the plurality of concurrently displayed input regions;
   electronically rendering one or more visual indicia that distinguish the active input region from at least one non-active input region of the concurrently displayed input regions so as to cue a user regarding an expected multi-token speech input, the active input region comprising at least first and second input fields;
   generating an audio and/or textual prompt that identifies the active input region without listing the first and second input fields; and
   processing a user-provided multi-token speech input, the user-provided multi-token speech input comprising at least first and second values, wherein the first and second values respectively correspond to the first and second input fields.

2. The method of claim 1, wherein the one or more visual indicia comprises highlighting, coloring and/or shading.

3. The method of claim 1, wherein the one or more visual indicia comprises at least one mark.

4. The method of claim 1, wherein the one or more visual indicia comprises a visual aspect of each of the plurality of input fields associated with the active input region.

5. The method of claim 1, wherein a first grammar is used for the active input region, and a second grammar, different from the first grammar, is used for another one of the plurality of input regions.

6. A method for prompting and processing user input for a multimodal interface, the method comprising:
   electronically rendering a visual interface for the multimodal interface, the visual interface comprising a plurality of concurrently displayed input regions;
   selecting an active input region of the plurality of concurrently displayed input regions;
   electronically rendering one or more visual indicia that distinguish the active input region from at least one non-active input region of the concurrently displayed input regions so as to cue a user regarding an expected multi-token speech input, the active input region comprising at least first and second input fields;
   processing a user-provided multi-token speech input, the user-provided multi-token speech input comprising at least first and second values, wherein the first and second values respectively correspond to the first and second input fields; and
   electronically rendering one or more second visual indicia that identify an incomplete input field associated with the active input region.

7. The method of claim 6, wherein the one or more second visual indicia comprises highlighting.

8. The method of claim 6, wherein the one or more visual indicia that distinguish the active input region from at least one non-active input region are concurrently displayed with the one or more second visual indicia that identify the incomplete input field.

9. The method of claim 6, further comprising automatically rendering, in response to completion of the active input region, one or more third visual indicia that identify a second active input region.

10. At least one non-transitory computer-readable storage medium encoded with instructions that, when executed on at least one processing unit, perform a method for prompting and processing user input for a multimodal interface, the method comprising:
  electronically rendering a visual interface for the multimodal interface, the visual interface comprising a plurality of concurrently displayed input regions;
  selecting an active input region of the plurality of concurrently displayed input regions;
  electronically rendering one or more visual indicia that distinguish the active input region from at least one non-active input region of the concurrently displayed input regions so as to cue a user regarding an expected multi-token speech input, the active input region comprising at least first and second input fields;
  generating an audio and/or textual prompt that identifies the active input region to be input without listing the first and second input fields and
  processing a user-provided multi-token speech input, the user-provided multi-token speech input comprising at least first and second values, wherein the first and second values respectively correspond to the first and second input fields.

11. The at least one non-transitory computer-readable storage medium of claim 10, wherein the one or more visual indicia comprises highlighting, coloring and/or shading.

12. The at least one non-transitory computer-readable storage medium of claim 10, wherein the one or more visual indicia comprises at least one mark.

13. The at least one non-transitory computer-readable storage medium of claim 10, wherein the one or more visual indicia comprises a visual aspect of each of the plurality of input fields associated with the active input region.

14. The at least one non-transitory computer-readable storage medium of claim 10, wherein a first grammar is used for the active input region, and a second grammar, different from the first grammar, is used for another one of the plurality of input regions.

15. At least one non-transitory computer-readable storage medium encoded with instructions that, when executed on at least one processing unit, perform a method for prompting and processing user input for a multimodal interface, the method comprising:
  electronically rendering a visual interface for the multimodal interface, the visual interface comprising a plurality of concurrently displayed input regions;
  selecting an active input region of the plurality of concurrently displayed input regions;
  electronically rendering one or more visual indicia that distinguish the active input region from at least one non-active input region of the concurrently displayed input regions so as to cue a user regarding an expected multi-token speech input, the active input region comprising at least first and second input fields;
  processing a user-provided multi-token speech input, the user-provided multi-token speech input comprising at least first and second values, wherein the first and second values respectively correspond to the first and second input fields; and
  electronically rendering one or more second visual indicia that identify the an incomplete input field associated with the active input region.

16. The at least one non-transitory computer-readable storage medium of claim 15, wherein the one or more second visual indicia comprises highlighting.

17. The at least one non-transitory computer-readable storage medium of claim 15, wherein the one or more visual indicia that distinguish the active input region from at least one non-active input region are concurrently displayed with the one or more second visual indicia that identify the incomplete input field.

18. The at least one non-transitory computer-readable storage medium of claim 15, wherein the method further comprises automatically rendering, in response to completion of the active input region, one or more third visual indicia that identify a second active input region.

19. An apparatus for prompting and processing user input for a multimodal interface, the apparatus comprising:
  a display device;
  an audio output device;
  a memory to store processor-executable instructions; and
  at least one processing unit coupled to the display device and the memory, wherein upon execution of the processor-executable instructions by the at least one processing unit, the at least one processing unit:
    A) electronically renders, for display on the display device, a visual interface for the multimodal interface, the visual interface comprising a plurality of concurrently displayed input regions;
    B) selects an active input region of the plurality of concurrently displayed input regions;
    C) electronically renders, for display on the display device, one or more visual indicia that distinguish the active input region from at least one non-active input region of the concurrently displayed input regions so as to cue a user regarding an expected multi-token speech input, the active input region comprising at least first and second input fields;
    D) controls the audio output device to output an audio prompt and/or electronically renders a textual prompt, for display on the display device wherein the audio prompt and/or textual prompt identifies the active input region without listing the first and second input fields; and
    E) processes a user-provided multi-token speech input, the user-provided multi-token speech input comprising at least first and second values, wherein the first and second values respectively correspond to the first and second input fields.

20. The apparatus of claim 19, wherein the one or more visual indicia comprises highlighting, coloring and/or shading.

21. The apparatus of claim 19, wherein the one or more visual indicia comprises at least one mark.

22. The apparatus of claim 19, wherein the one or more visual indicia comprises a visual aspect of each of the plurality of input fields associated with the active input region.

23. The apparatus of claim 19, wherein a first grammar is used for the active input region, and a second grammar, different from the first grammar, is used for another one of the plurality of input regions.

24. An apparatus for prompting and processing user input for a multimodal interface, the apparatus comprising:
- a display device;
- a memory to store processor-executable instructions; and
- at least one processing unit coupled to the display device and the memory, wherein upon execution of the processor-executable instructions by the at least one processing unit, the at least one processing unit:
  - A) electronically renders, for display on the display device, a visual interface for the multimodal interface, the visual interface comprising a plurality of concurrently displayed input regions;
  - B) selects an active input region of the plurality of concurrently displayed input regions;
  - C) electronically renders, for display on the display device, one or more visual indicia that distinguish the active input region from at least one non-active input region of the concurrently displayed input regions so as to cue a user regarding an expected multi-token speech input, the active input region comprising at least first and second input fields;
  - D) processes a user-provided multi-token speech input, the user-provided multi-token speech input comprising at least first and second values, wherein the first and second values respectively correspond to the first and second input fields; and
  - E) electronically renders, for display on the display device, one or more second visual indicia that identify an incomplete input field associated with the active input region.

25. The apparatus of claim 24, wherein the one or more second visual indicia comprises highlighting.

26. The apparatus of claim 24, wherein the one or more visual indicia that distinguish the active input region from at least one non-active input region are concurrently displayed with the one or more second visual indicia that identify the incomplete input field.

27. The apparatus of claim 24, wherein the at least one processing unit:
- F) automatically electronically renders, in response to completion of the active input region, one or more third visual indicia that identify a second active input region.

* * * * *